United States Patent [19]
Greenwood et al.

[11] 3,820,755
[45] June 28, 1974

[54] POPPET VALVE

[75] Inventors: Roger Greenwood, Northridge;
Donald F. McGregor, Burbank, both of Calif.

[73] Assignee: International Telephone and Telegraph Corporation, New York, N.Y.

[22] Filed: Feb. 20, 1973

[21] Appl. No.: 334,052

[52] U.S. Cl. ................................. 251/85, 251/86
[51] Int. Cl. ............................................ F16k 1/32
[58] Field of Search ............................... 251/85, 86

[56] References Cited
UNITED STATES PATENTS

| | | | |
|---|---|---|---|
| 1,236,939 | 8/1917 | Huber | 251/86 |
| 2,639,884 | 5/1953 | Mitchell | 251/85 |
| 2,713,986 | 7/1955 | Suthan | 251/86 |
| 3,417,668 | 12/1968 | Lawson | 251/86 X |

FOREIGN PATENTS OR APPLICATIONS

| | | | |
|---|---|---|---|
| 707,558 | 4/1954 | Great Britain | 251/86 |

*Primary Examiner*—Robert G. Nilson
*Attorney, Agent, or Firm*—A. Donald Stolzy

[57] ABSTRACT

A poppet valve including a valve stem having a rubber O-ring axially compressed against a rigid disc portion of a valve therearound to provide a fluid tight seal between the O-ring and both the valve stem and the disc. The O-ring approximately aligns the valve for proper initial seating prior thereto. However, the O-ring also permits improved final seating because it is resilient and allows the valve to rock relative to the stem until it finds the best seal with the seat. The use of this valve-to-stem connection is valuable in a number of applications. In some cases it is difficult to hold adequate manufacturing tolerances so that there are intolerable differences in the locations or orientations of the valve seat axis and the valve axis. The said valve-to-stem connection is also valuable when two valves are operated in tandem on the same stem. When one valve seats, the relative locations and orientations of both valves and valve seats are not so critical.

2 Claims, 4 Drawing Figures

PATENTED JUN 28 1974

POPPET VALVE

BACKGROUND OF THE INVENTION

This invention relates to poppet valves or the like, and more particularly, a connection for use between a valve and a valve stem.

In many cases, including, but not limited to, small valves, it is difficult to maintain manufacturing tolerances which the fabrication of valve seats and valves require for proper seating.

Still further, it is sometimes more difficult to operate two valves in tandem on the same stem and obtain adequate seating for both valves simultaneously.

SUMMARY OF THE INVENTION

In accordance with the device of the present invention, the above-described and other disadvantages of the prior art are overcome by providing a swivel type connection between a valve and valve stem.

Other outstanding advantages of the present invention are obtained by the use of a body to perform three functions. The first function is, more or less, to spring bias a valve into an approximately accurate alignment with a valve seat. The second function is to allow the valve to rock on the valve stem and to seek its proper seating orientation. The third function is to seal the valve stem to the valve.

It is another outstanding advantage of the present invention that an O-ring has been combined with other structures to perform all three of the said functions.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
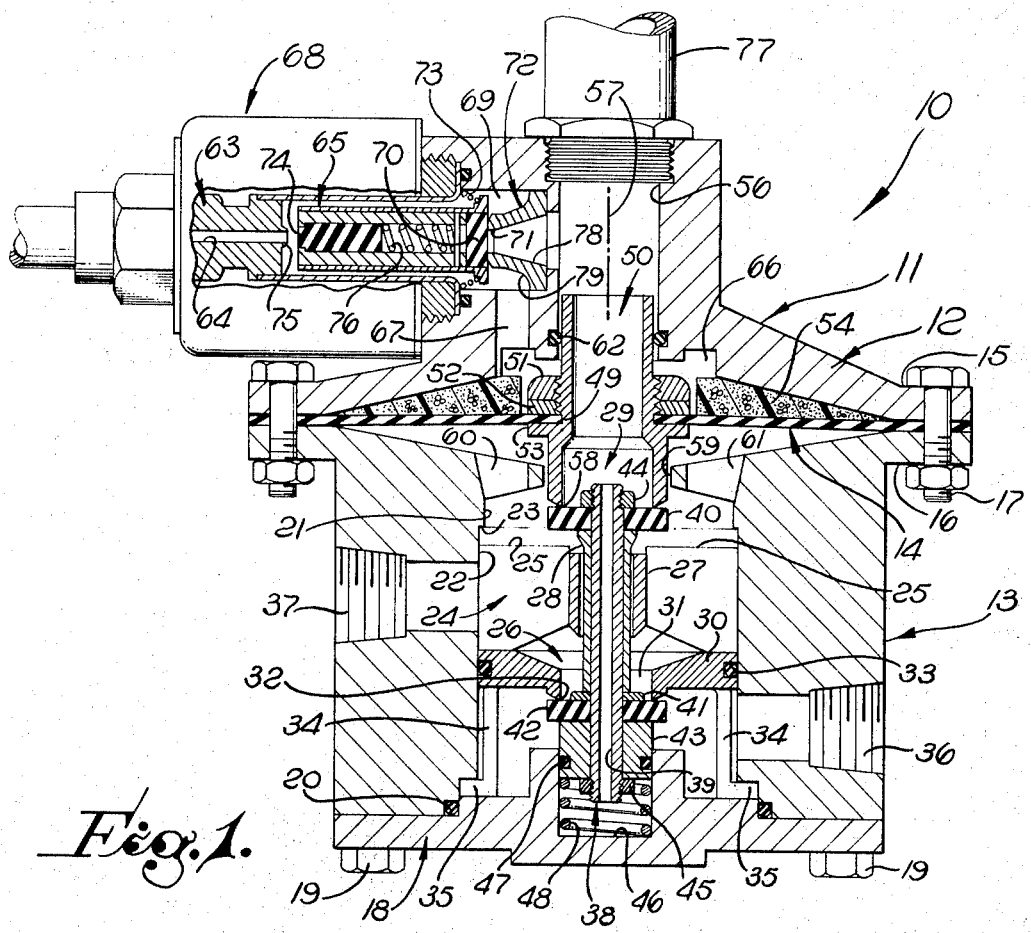
FIG. 1 is a vertical sectional view of a valve.
Figure 2:
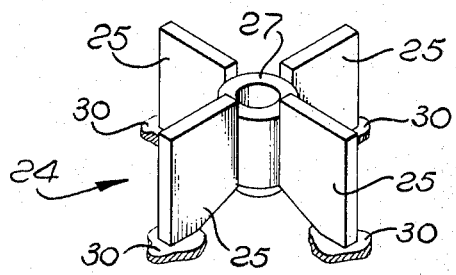
FIGS. 2 and 3 are perspective views of two different but integrally die cast and machined spiders employed in the valve of FIG. 1.
Figure 3:
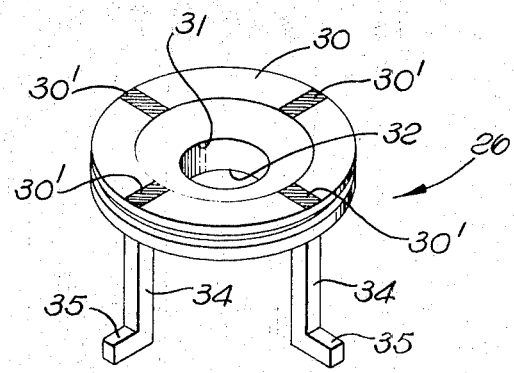

FIGS. 1, 2 and 3 and the description thereof herein are in many ways identical to the contents of copending application Ser. No. 217,539 filed Jan. 13, 1972, by ROGER GREENWOOD for DIAPHRAGM VALVE AND COMPONENTS THEREOF, now abandoned.

In the drawings, in FIG. 1, a valve is shown having a body 11. Valve housing or body 11 includes a bonnet 12 and a base portion 13. A diaphragm 14 has its edges fixed between circular flanges 15 and 16 of bonnet 12 and base portion 13, respectively, by bolts 17. Body 11 also includes a lower end plate 18 which is fixed to base portion 13 by cap screws 19. End plate 18 is sealed to base portion 13 by an O-ring 20.

Base portion 13 has a cylindrical bore 21 and a counterbore 22 slightly larger than bore 21 reaching a shoulder at 23. Valve 10 includes a spider 24 that has vanes 25 integral with a plate 30 of a spider 26 at 30' in FIG. 3. See both of FIGS. 2 and 3. Vanes 25 are integral with a cylinder 27 through which a sleeve 28 of a poppet 29 is slidable. See FIGS. 1 and 2. Spider 24 is shown in FIG. 2. Spider 26 is shown in FIG. 3 including plate 30 having a hole 31 therethrough surrounded by a valve seat 32, as shown in FIG. 1. Plate 30 is sealed to bore 22 by an O-ring 33. Spider 26 also has four legs 34 with feet 35 integral therewith. Legs 34 are integral with plate 30. Feet 35 are clamped between base portion 13 and plate 18. Base portion 13 has an inlet port 36, and an outlet port 37. Two or more outlet ports 37 may be provided, if desired. Typically, air under a pressure of 130 pounds per square inch may be supplied through inlet port 36.

Poppet 29 includes a hollow tube 38 having a passageway 39 extending completely therethrough. A valve disc 40 is positioned around tube 38 above sleeve 28. A washer 41, a valve disc 42 and a member 43 are positioned in succession around tube 38 below sleeve 28. A nut 44 is threaded onto the exterior of the upper end of tube 38. A nut 45 is threaded onto the exterior of the lower end of tube 38. Nuts 44 and 45 are thus tightened. This places tube 38 in tension, and it places all the structures therearound in compression.

Plate 18 has a recess 46 therein which is cylindrical. Member 43 is likewise cylindrical. Member 43 is, thus, slidable in recess 46. An O-ring 47 provides a fluid tight seal between member 43 and recess 46. A helically coiled spring 48 is positioned in recess 46 to bias poppet 29 to its uppermost position, as shown in FIG. 1.

Diaphragm 14 has a circular hole 49 therethrough. A sleeve 50 is fixed through hole 49 to diaphragm 14 by a nut 51 threaded to sleeve 50. Nut 51 presses a washer 52 against diaphragm 14, and diaphragm 14 against a flange 53 integral with sleeve 50.

A frusto-conical polyurethane sponge 54 is positioned between the upper side of diaphragm 14 and a mating frusto-conical surface 55 of bonnet 12. Sponge 54 may or may not be bonded to either diaphragm 14 or bonnet 12, as desired. However, if bonding is desired, preferably, sponge 54 is bonded to surface 55 and not to diaphragm 14. Bonnet 12 has a bore 56. Bore 56 has a cylindrical surface. The cylindrical surface of bore 56 has an axis 57. If desired, many parts of this construction shown in FIG. 1 may be symmetrical about axis 57, as shown.

As can be seen in FIG. 1, disc 42 acts as a valve which seals off hole 31 by engaging valve seat 32. Similarly, disc 40 seals off the hollow interior of sleeve 50 by engaging a valve seat 58 at the lower end thereof.

The lower end of sleeve 50 is guided through a cylindrical opening 59 through a spider 60 integral with base portion 13 having, for example, eight holes 61 therethrough.

Sleeve 50 is also slidably guided in bore 56. An O-ring 62 provides a fluid tight seal between the external surface of sleeve 50 and bore 56.

A body 63 is fixed relative to body 11. Body 63 has an inlet passageway 64. Air is admitted to passageway 64 in accordance with brake pedal pressure in a conventional air brake system, for example. This pressure may vary, for example, from 0 to 100 pounds per square inch. Air through passageway 64, when plunger 65 is in the position shown, may enter a space 66 above diaphragm 14 through a cylindrical port 67 in bonnet 12. Air can arrive at port 67 because plunger 65 is loosely retained inside a solenoid housing 68. Air exiting from passageway 64 to the right, as viewed in FIG. 1, may thus flow around plunger 65 to a space 69 to the right thereof, and into the port 67. Plunger 65 has a valve disc 70 which is biased into engagement with a seat 71 on a fitting 72 by a coiled spring 73. Fitting 72 is fixed to and sealed to bonnet 12. A valve 74 is capable of resting on a valve seat 75 on body 63. A spring 76 normally biases valve 74 to the position shown in FIG. 1, but allows it to remain substantially stationary on seat 75 while the remainder of plunger 65 overtravels, i.e. moves to the left a small amount.

The sponge 54 permits faster dumping. That is, air from the brake cylinders entering through port 67 in space 66 may be vented to the atmosphere more quickly.

Faster dumping is also obtained by employing the frusto-conical internal surface 78 of fitting 72, as shown in FIG. 1. The same is true of the tangency of the external surface 79 to the internal surface of port 67.

OPERATION

In the operation of the valve shown in FIG. 1, diaphragm 14 may be in the position shown. Diaphragm 14 is flexible and may or may not be made of rubber or a rubber-like material. Sponge 54, by definition, has at least some flexibility. When brake pedal pressure is applied, pressure is supplied through passageway 64, and diaphragm 14 moves downwardly. This keeps disc 40 in sealing engagement with seat 58 but pushes disc 42 away from seat 32. The air entering is then allowed to enter the brake cylinders through port 37. As soon as the pressure below diaphragm 14 becomes equal to the pressure thereabove, disc 42 again engages seat 32. As the air under pressure in passageway 64 is vented to atmosphere, the pressure below diaphragm 14 will exceed that in space 66. Diaphragm 14 will then lift seat 58 off of disc 40, and the space below diaphragm 14 will be vented to the atmosphere through sleeve 50, bore 56 and vent valve 77.

Now assume again that brake pedal pressure is applied and air under pressure is supplied through passageway 64. In the meantime, an anti-skid brake control system can be calling for a release of brake pressure by the energization of the solenoid in housing 68 (not shown). In this case, valve 74 will close against seat 75, and disc 70 will move away from seat 71. Air under pressure in space 66 will then be vented to atmosphere through port 67, through the hole in fitting 72, into bore 56 and outwardly of vent valve 77. Diaphragm 14 will then move up and lift seat 58 off of disc 40, and vent the space below to the atmosphere, as before, through sleeve 50, bore 56 and vent valve 77.

As stated previously, the use of sponge 54 increases the dumping rate. This is the rate at which the pressure is reduced below diaphragm 14 when seat 58 is lifted off of disc 40. However, the dumping rate, during computer control of the solenoid in housing 68, is also dependent upon the rate at which the pressure in space 66 is dumped through port 67, through fitting 72, through bore 56 and through vent valve 77. That is the reason that the shape of surface 78 and the tangency of surface 79 with the surface of port 67 are important.

It is an advantage of the poppet 29 that recess 46 is vented to atmosphere through vent valve 77. Vent valve 77 keeps the interior of the valve 10 clean and free from contaminants external thereto; i.e. from dirt, etc.

Recess 46 is vented through passageway 39 so as to prevent member 43 and O-ring 47 from impeding motion of poppet 29 by trapping air inside recess 46.

Figure 4:
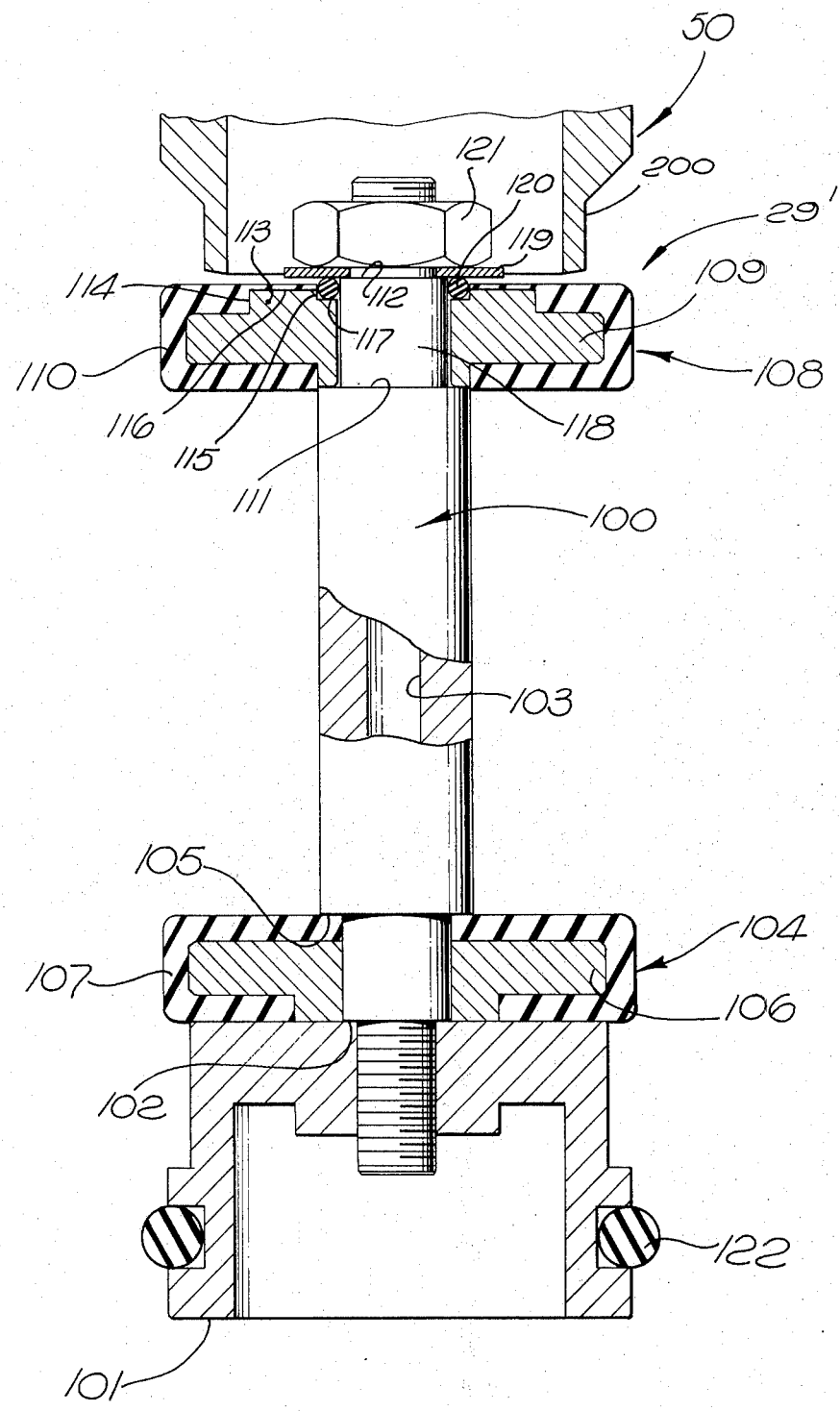
FIG. 4 is a substantially enlarged vertical sectional view, partly in elevation, of a poppet constructed in accordance with the present invention, the poppet being useful with or without some of the structures illustrated in FIG. 1.

In accordance with the present invention, a poppet 29' shown in FIG. 4 is substituted for the poppet 29 shown in FIG. 1.

Poppet 29' includes a valve stem 100 threaded into an inverted cup-shaped member 101. Valve stem 100 has a shoulder 102, whereby valve stem 100 may be fixed tightly relative to member 101 by screwing thereinto until shoulder 102 abuts the upper surface of member 101, if desired.

Cup-shaped member 101 carries an O-ring 122 similar to O-ring 47.

Valve stem 100 has a passageway 103 extending completely therethrough. However, passageway 103 may be omitted in some applications of the present invention.

A valve 104 is clamped between a shoulder 105 on valve stem 100 and the upper surface of member 101. Valve 104 includes a circular metal plate 106 having a rubber covering 107 bonded thereto in a conventional manner. Another valve 108 similarly has a plate 109 and a rubber covering 110 bonded thereto.

Plate 109 has an inside diameter greater than the outside diameter of the portion 118 of valve stem 100 between shoulders 111 and 112 thereon so as to permit valve 108 to rock on shoulder 111.

Plate 109 has an integral axial, i.e., upwardly extending annular projection 113. Projection 113 has concentric cylindrical surfaces 114 and 115 which may have an axis of revolution which is identical to the axis of revolution of the external surface of valve stem portion 118.

Plate 109 has a surface 117. Projection 113 has a surface 116.

A washer 119 with valve stem portion 118 and surfaces 115 and 117 approximately define an annular space which is substantially filled by a conventional rubber O-ring 120.

The washer 119 is clamped tightly against valve stem shoulder 112 by a nut 121 threaded onto the upper end of valve stem 100.

The poppet 29' is constructed so that O-ring 120 is in compression in all positions thereof including, but not limited to, the one shown in FIG. 4.

In accordance with the present invention, the O-ring 120 performs three functions. By use of O-ring 120, valve 108 is rockable to seek a tight seal with seat 58 if there is some misalignment.

In the second place, the O-ring 120 acts as a spring to bias valve 108 to an approximately accurate position when it is out of engagement with seat 58.

Still further, the O-ring 120 provides a fluid tight seal to surfaces 115, 117 and the external surface of valve stem portion 118.

Note will be taken that the rocking action of valve 108 is also permitted because washer 119 is spaced from projection surface 116.

Downward motion of valve 108 is limited because valve 108 rests on shoulder 111. If desired, valve 104 may be clamped between valve stem shoulder 102 and member 101.

In FIG. 4, the seat 58 for upper valve 108 may be stationary in another alternative embodiment of the present invention. In this case means may be provided to move the structures of FIG. 4 back and forth in the direction of the valve stem axis.

Sleeve 50 is relieved at 200 in FIG. 4. This is not shown in FIG. 1 for clarity.

Surface 116 in FIG. 4 has a portion covering 110 thereon. Washer 119 is spaced from this portion also as shown in FIG. 4.

Some of the structures illustrated in FIG. 4 may be omitted in some practices of the present invention, and all of the structures shown in FIG. 4 may be modified to a certain extent without departing from the true scope of the invention.

Preferably the structures shown in FIG. 4 are not employed with sponge 54, although the structures shown in FIG. 4 may or may not be employed with one or more or all of the structures illustrated in FIGS. 1, 2 and 3. However, some or all of the component parts of poppet 29 will normally be omitted in lieu of poppet 29'.

In some embodiments of the present invention, the structures of FIG. 4 may be fixed.

Although many valve seats desirably have circular edges defining respective circles in respective flat planes normal to the valve axes, the edges are only approximately circular and the planes of the circles thereof are only approximately flat, and the planes are only approximately normal to the valve axes. This is all true because the production of a part to a manufacturing tolerance precisely equal to zero is, of course, not possible. The rocking action of valve 108 thus makes it unnecessary to manufacture valve 108 and seat 58 very accurately to zero or almost zero tolerances. Note will be taken that it is difficult and expensive to manufacture to a small tolerance.

The word "poppet" is hereby defined for use herein and for use in the claims to mean a part which includes a valve stem or the like and a valve thereon which stem may be movable relative to a valve housing or which may be fixed relative to a valve housing.

What is claimed is:

1. A fluid flow control device comprising: a valve housing; valve seat means mounted in said valve housing, said valve seat means including a valve seat defining a port; and valve poppet means mounted in said housing, said valve poppet means having a valve mounted thereon, at least one of said means being movable toward and away from the other of said means to bring said valve and valve seat, respectively, into and out of mutual fluid tight sealing engagement to seal off and to open said port, respectively, said valve poppet means including a rigid valve stem and apparatus mounting said valve on said rigid valve stem, said valve seat being constructed in a manner such that it has a closed loop portion engageable with said valve, said valve seat portion lying approximately in a single first plane, said valve being constructed in a manner such that it has a portion engageable with said valve seat, said valve portion also lying approximately in a single second plane, said apparatus being constructed in a manner such that said valve can be rocked about any axis which is at least approximately parallel to said first plane and approximately in said second plane, said apparatus including a universal joint, said apparatus including a resilient support which performs three functions; namely, (1) biasing said valve to a single position when said valve is spaced from said valve seat, (2) allowing rocking action of said valve in the event of valve-seat misalignment, and (3) providing a fluid tight seal between said valve and said stem; said port being approximately cylindrical, said valve stem and said port having an approximately common axis of symmetry, said valve including a rigid circular disc having a circular edge, a central cylindrical hole therethrough and a cylindrical projection extending therefrom in a direction toward said port, a layer of rubber fixed relative to said disc over the surface thereof from said projection to said circular plate edge and over all of the opposite surface thereof, said projection being concentric with said hole and spaced therefrom, said projection having an internal cylindrical surface of a predetermined inside diameter, said disc having an annular surface in said second plane normal to said axis between said hole and said projection, said valve stem having first, second and third portions of successively smaller outside diameters in a direction toward said port, respectively, a first shoulder being located between said first and second portions, a second shoulder being located between said second and third portions, said layer of rubber having a hole therethrough through which said second portion projects, said second portion being cylindrical, said second portion projecting through said disc hole, said disc hole being defined by an internal cylindrical surface of said disc of an inside diameter greater than the outside diameter of said second portion, a washer extending around said third portion in engagement with said second shoulder, a nut threaded onto said third portion holding said washer tight to said second shoulder, a rubber O-ring in the annular space defined by four surfaces, namely, said shaft second portion, the inside cylindrical surface of said projection, the said annular surface on said disc and said washer, said O-ring being of a size sufficiently large that it is maintained in sealing pressure contact with the said four surfaces, said washer being spaced from said projection.

2. A fluid flow control device comprising: a valve housing; valve seat means mounted in said valve housing, said valve seat means including a valve seat defining a port; and valve poppet means mounted in said housing, said valve poppet means having a valve mounted thereon, at least one of said means being movable toward and away from the other of said means to bring said valve and valve seat, respectively, into and out of mutual fluid tight sealing engagement to seal off and to open said port, respectively, said valve poppet means including a rigid valve stem and appratus mounting said valve on said rigid valve stem, said valve seat being constructed in a manner such that it has a closed loop portion engageable with said valve, said valve seat portion lying approximately in a single first plane, said valve being constructed in a manner such that it has a portion engageable with said valve seat, said valve portion also lying approximately in a single second plane, said apparatus being constructed in a manner such that said valve can be rocked about any axis which is at least approximately parallel to said first plane and approximately in said second plane; said port being approximately cylindrical, said valve stem and said port having an approximately common axis of symmetry, said valve including a disc, a central cylindrical hole through said disc, a cylindrical projection extending from said disc in an axial direction, a layer of resilient material fixed relative to said disc over the surface thereof to seal off said port, said projecting being concentric with said hole and spaced therefrom, said projection having an internal cylindrical surface of a predetermined inside diameter, said disc having an annular surface in said second plane normal to said axis between said hole and said projection, said valve stem having first, second and third portions of successively smaller outside diameters in a direction toward said port, respectively, a first shoulder being located between said first and second portions, a second shoulder being located between said second and third portions, said layer having a hole therethrough through which said second portion projects, said second portion being cylindrical, said second portion projecting through said disc hole, said disc hole being defined by an internal cylindrical surface of said disc of an inside diameter greater than the outside diameter of said second portion, a washer extending around said third portion in engagement with said second shoulder, a nut threaded onto said third portion holding said washer tight to said second shoulder, a rubber O-ring in the annular space defined by four surfaces, namely, said shaft second portion, the inside cylindrical surface of said projection, the said annular surface on said disc and said washer, said O-ring being of a size sufficiently large that it is maintained in sealing pressure contact with the said four surfaces, said washer being spaced from said projection for self alignment of said valve with said seat.

* * * * *